(12) United States Patent  
Kakuya et al.

(10) Patent No.: US 12,444,844 B2  
(45) Date of Patent: Oct. 14, 2025

(54) ANTENNA MOUNTING SYSTEM (71) Applicant: DENSO CORPORATION, Kariya (JP)

(72) Inventors: Yuuji Kakuya, Nisshin (JP);  
Kenichirou Sanji, Kariya (JP);  
Tomokazu Miyashita, Kariya (JP);  
Masakazu Ikeda, Nisshin (JP)

(73) Assignee: DENSO CORPORATION, Kariya (JP)

( * ) Notice: Subject to any disclaimer, the term of this patent is extended or adjusted under 35 U.S.C. 154(b) by 393 days.

(21) Appl. No.: 18/079,323

(22) Filed: Dec. 12, 2022

(65) Prior Publication Data

US 2023/0114784 A1 Apr. 13, 2023

Related U.S. Application Data

(63) Continuation of application No. PCT/JP2021/024123, filed on Jun. 25, 2021.

(30) Foreign Application Priority Data

Jul. 6, 2020 (JP) .................. 2020-116682

(51) Int. Cl.
| | |
|---|---|
| *H01Q 9/04* | (2006.01) |
| *H01Q 1/12* | (2006.01) |
| *H01Q 1/48* | (2006.01) |
| *H01Q 3/36* | (2006.01) |

(52) U.S. Cl.  
CPC ............. *H01Q 9/0421* (2013.01); *H01Q 1/12* (2013.01); *H01Q 1/48* (2013.01); *H01Q 3/36* (2013.01)

(58) Field of Classification Search  
None  
See application file for complete search history.

(56) References Cited

U.S. PATENT DOCUMENTS

| 2018/0301798 A1 | 10/2018 | Ikeda et al. | |
|---|---|---|---|
| 2022/0006195 A1* | 1/2022 | Ikeda | ............ H01Q 9/045 |

FOREIGN PATENT DOCUMENTS

| JP | 3669895 B2 | 7/2005 |
|---|---|---|
| JP | 2016111655 A | 6/2016 |

* cited by examiner

*Primary Examiner* — Whitney Moore  
(74) *Attorney, Agent, or Firm* — Harness, Dickey & Pierce, P.L.C.

(57) ABSTRACT

An antenna mounting system includes an antenna device and a conductive base plate. The antenna device includes a ground plate, an opposing conductive plate, and a short-circuit pin. The short-circuit pin is positioned to cause a radio wave radiated from the antenna device in a direction perpendicular to the ground plate such that radio wave: has a polarization component that oscillates in a direction parallel to a main plane of polarization of a radio wave radiated from the conductive base plate in the direction perpendicular to the ground plate; and is shifted in phase from the radio wave radiated from the conductive base plate by a phase difference within a range from 90 degrees to 270 degrees.

3 Claims, 6 Drawing Sheets

ANTENNA MOUNTING SYSTEM

CROSS REFERENCE TO RELATED APPLICATIONS

The present application is a continuation application of International Patent Application No. PCT/JP2021/024123 filed on Jun. 25, 2021, which designated the U.S. and claims the benefit of priority from Japanese Patent Application No. 2020-116682 filed on Jul. 6, 2020. The entire disclosures of all of the above applications are incorporated herein by reference.

TECHNICAL FIELD

The present invention relates to an antenna mounting system.

BACKGROUND

An antenna device uses zeroth-order resonance and is mounted on a conductive base plate.

SUMMARY

According to at least one embodiment of the present disclosure, an antenna mounting system includes an antenna device and a conductive base plate. The conductive base plate is made of a conductor on which the antenna device is mounted. The antenna device includes a ground plate, an opposing conductive plate, and a short-circuit pin. The ground plate is made of a conductor with a flat plate shape. The opposing conductive plate is made of a conductor with a flat plate shape, located a predetermined distance away from the ground plate, and electrically connected to a feeder line. The short-circuit pin electrically connects the opposing conductive plate and the ground plate. The short-circuit pin is positioned to cause a radio wave radiated from the antenna device in a direction perpendicular to the ground plate such that the radio wave: has a polarization component that oscillates in a direction parallel to a main plane of polarization of a radio wave radiated from the conductive base plate in the direction perpendicular to the ground plate; and is shifted in phase from the radio wave radiated from the conductive base plate by a phase difference within a range from 90 degrees to 270 degrees.

BRIEF DESCRIPTION OF DRAWINGS

The details of one or more embodiments are set forth in the accompanying drawings and the description below. Other features and advantages will be apparent from the description and drawings, and from the claims.

DETAILED DESCRIPTIONS

To begin with, examples of relevant techniques will be described. According to a comparative example, an antenna device using zeroth-order resonance includes a flat plate-shaped ground plate that is connected to an outer conductor of a power supply cable and functions as a ground, a flat plate-shaped conductive plate arranged opposite to the ground plate and provided with a feeding point at an arbitrary position, and a short-circuit portion that electrically connects the ground plate and the conductive plate.

In the comparative example, the short-circuit portion is placed at a center of the conductive plate. Thus, radiation of a radio wave in a direction perpendicular to the ground plate does not occur when the comparative example is used solely.

However, when the comparative example is mounted on a conductive base plate made of a conductor such as a vehicle body, an electromagnetic coupling between the comparative example and the conductive base plate causes a current flowing through the conductive base plate. This current may generate an unnecessary radiation in a direction perpendicular to the ground plate.

In contrast to the comparative example, according to the present disclosure, such unnecessary radiation of radio wave in a direction perpendicular to a ground plate can be reduced.

According to an aspect of the present disclosure, an antenna mounting system includes an antenna device and a conductive base plate. The conductive base plate is made of a conductor on which the antenna device is mounted. The antenna device includes a ground plate, an opposing conductive plate, and a short-circuit pin. The ground plate is made of a conductor with a flat plate shape. The opposing conductive plate is made of a conductor with a flat plate shape, located a predetermined distance away from the ground plate, and electrically connected to a feeder line. The short-circuit pin that electrically connects the opposing conductive plate and the ground plate. The short-circuit pin is positioned to cause a radio wave radiated from the antenna device in a direction perpendicular to the ground plate such that the radio wave: has a polarization component that oscillates in a direction parallel to a main plane of polarization of a radio wave radiated from the conductive base plate in the direction perpendicular to the ground plate; and is shifted in phase from the radio wave radiated from the conductive base plate by a phase difference within a range from 90 degrees to 270 degrees.

In this antenna mounting system, a current also flows through the conductive base plate due to electromagnetic coupling between the antenna device and the conductive base plate. This current causes the radio wave radiated from the conductive base plate in the direction perpendicular to the ground plate, and this radio wave is unnecessary.

However, in this antenna mounting system, the antenna device also radiates the radio wave in the direction perpendicular to the ground plate. A main plane of polarization of the radio wave radiated from the antenna device in the direction perpendicular to the ground plate can be adjusted by adjusting a direction from a center of the opposing conductive plate toward a position at which the opposing conductive plate is connected to the short-circuit pin. In addition, a phase of the radio wave radiated from the antenna device in the direction perpendicular to the ground plate can be adjusted by adjusting a distance from the center of the opposing conductive plate to the position at which the opposing conductive plate is connected to the short-circuit pin.

In this antenna mounting system, the radio wave radiated from the antenna device in the direction perpendicular to the ground plate has the polarization component that oscillates in the direction parallel to the main plane of polarization of the radio wave radiated from the conductive base plate in the direction perpendicular to the ground plate. In addition, the radio wave radiated from the antenna device in the direction perpendicular to the ground plate is shifted in phase from the radio wave radiated from the conductive base plate in the direction perpendicular to the ground plate by the phase difference within the range from 90 degrees to 270 degrees. Since the radio waves radiated from the antenna device and the conductive base plate have this phase difference, a signal strength of a composite wave of the radio waves can be lower than a signal strength of the radio wave radiated from the conductive base plate in the direction perpendicular to the ground plate. Therefore, radiation in the direction perpendicular to the ground plate is reduced.

Figure 1:
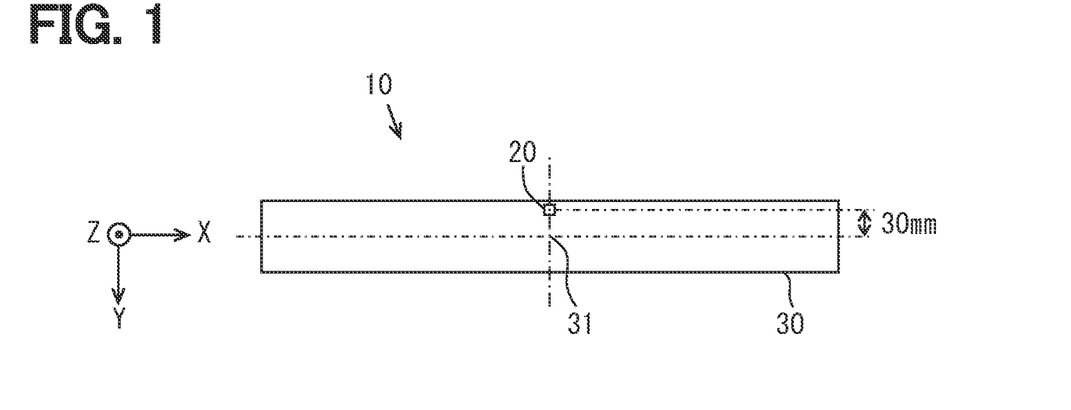
FIG. 1 is a diagram showing a configuration of an antenna mounting system.

The following will describe an embodiment of the present disclosure with reference to the drawings. FIG. 1 is a diagram showing an antenna mounting system 10 according to a present embodiment. The antenna mounting system 10 has a configuration in which an antenna device 20 is mounted on a conductive base plate 30.

The conductive base plate 30 shown in FIG. 1 is an iron plate for experimental use, and has a rectangular shape of 650×80 mm in length and width. Hereinafter, a lengthwise direction of the conductive base plate 30 is referred to as an X direction, a widthwise direction thereof is referred to as a Y direction, and a direction perpendicular to the XY plane is referred to as a Z direction. When the antenna device 20 is actually used, various conductive plates, such as vehicle pillars and vehicle roof panels, can be used as the conductive base plate 30.

A center of the antenna device 20 is located at a position shifted by 30 mm in the Y direction from a center 31 (hereinafter referred to as a base plate center) of the conductive base plate 30, in top view. The top view means a view of the antenna mounting system 10 from a direction perpendicular to the XY plane. The position of the antenna device 20 in the X direction is the same as that of the base plate center 31.

Figure 2:
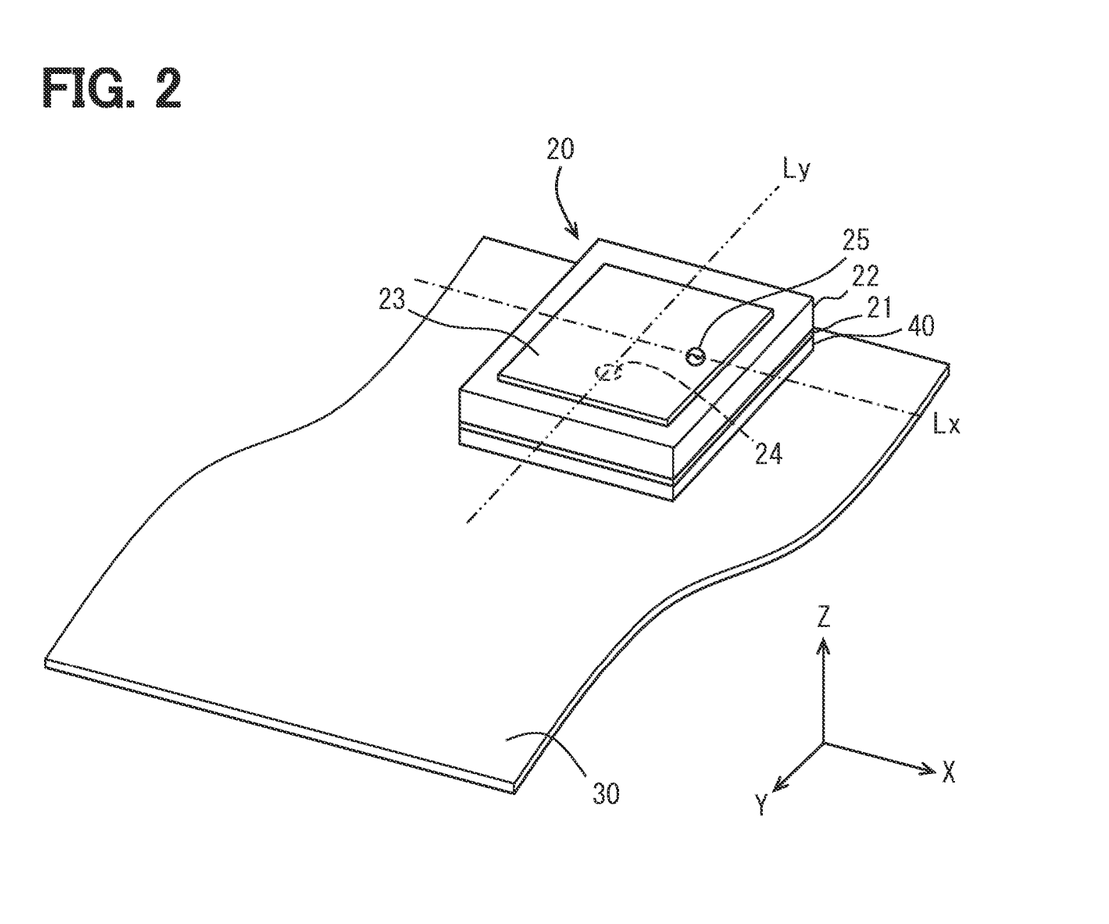
FIG. 2 is a perspective view of an antenna device.

FIG. 2 is a perspective view of an antenna device 20. The antenna device 20 is mounted on the conductive base plate 30 via an isolation plate 40 made of dielectric material. The isolation plate 40 has a square thin plate shape. The isolation plate 40 is arranged such that one set of opposite sides thereof are parallel to the X direction and another set of opposite sides thereof are parallel to the Y direction. The shape of the isolation plate 40 shown in FIG. 2 is an example. The isolation plate 40 is provided for a purpose of isolating the antenna device 20 from the conductive base plate 30. The shape of the isolation plate 40 is not particularly limited. Alternatively, the antenna device 20 may be mounted directly on the conductive base plate 30 without the isolation plate 40.

The antenna device 20 includes a ground plate 21, a support plate 22, an opposing conductive plate 23, and a short-circuit pin 24. The ground plate 21 is a conductive member having a plate shape and made of conductor such as copper. The ground plate 21 is provided along a lower surface of the support plate 22. The plate shape of the ground plate 21 also includes a thin film shape such as a metal foil. That is, the ground plate 21 may be a circuit trace formed on a surface of a resin plate such as a printed circuit board by electroplating or the like. The ground plate 21 is electrically connected to an external conductor of a coaxial cable and provides the ground potential. In the following descriptions, unless otherwise specified, an expression "connection" means an electrical connection.

The ground plate 21 has an area that matches an area of the isolation plate 40 in the top view. The ground plate 21 is formed in a square shape in the top view. However, the shape of the ground plate 21 is not limited to a square shape. The ground plate 21 may have a shape (hereinafter, a bi-directional line-symmetric shape) line-symmetrical about two straight lines orthogonal to each other as axes of symmetry. The bi-directional line symmetrical shape means a figure that is line-symmetric with respect to a first straight line as an axis of symmetry, and that is also line-symmetric with respect to a second straight line that is orthogonal to the first straight line. The bidirectional line symmetrical shape is, for example, an ellipse, a rectangle, a circle, a square, a regular hexagon, a regular octagon, or a rhombus. The ground plate 21 may have an area larger than a circle having a diameter of one wavelength.

The support plate 22 overlaps the ground plate 21 and the isolation plate 40 in the top view. The support plate 22 has a role arranging the ground plate 21 and the opposing conductive plate 23 so as to be separated by a predetermined distance and face each other. The support plate 22 is made of a dielectric material having a predetermined relative permittivity. A printed circuit board having base material such as glass epoxy resin may be used as the support plate 22. For example, the support plate 22 may be made of glass epoxy resin with a dielectric constant of 4.3.

By adjusting a thickness of the support plate 22, the distance between the opposing conductive plate 23 and the ground plate 21 can be adjusted, and simultaneously a length of the short-circuit pin 24 can be adjusted. When the distance between the opposing conductive plate 23 and the ground plate 21 and the length of the short-circuit pin 24 change, a frequency of a radio wave transmitted and received by the antenna device 20 changes. A specific value of the thickness of the support plate 22 may be appropriately determined by simulation or test so that the frequency of the radio wave transmitted and received by the antenna device 20 matches a desired frequency. When the frequency of the radio wave transmitted and received by the antenna device 20 is 2.45 GHz, the thickness of the support plate 22 is set to, for example, about 1 to 3 mm. This thickness is much shorter than 1/10 of the wavelength of the radio wave transmitted and received by the antenna device 20.

Although the present embodiment adopts a configuration in which a resin as the support plate 22 is filled between the ground plate 21 and the opposing conductive plate 23, the present embodiment may not be limited to this configuration. The gap between the ground plate 21 and the opposing conductive plate 23 may be hollow or vacuum. Furthermore, the support plate 22 may have a structure that consists of a resin and a hollow space.

The opposing conductive plate 23 is a conductive member having a plate shape and made of conductor such as copper. As described above, the plate shape here also includes a thin film shape such as copper foil. The opposing conductive plate 23 is arranged so as to face the ground plate 21 via the support plate 22. Similar to the ground plate 21, the opposing conductive plate 23 may also be a circuit trace formed on a surface of a resin plate such as a printed circuit board. In the present disclosure, "parallel" may not be limited to perfect parallel. The expression "parallel" also includes a state inclined from several degrees to about 10 degrees. That is, the expression "parallel" includes a substantially parallel state.

Since the opposing conductive plate 23 and the ground plate 21 face each other, a capacitance is generated according to an area of the opposing conductive plate 23 and the distance between the opposing conductive plate 23 and the ground plate 21. The opposing conductive plate 23 has a size that generates a capacitance that causes parallel resonance with an inductance generated by a current path such as the short-circuit pin 24 at a predetermined target frequency. The target frequency is the frequency of the radio wave transmitted and received by the antenna device.

The area of the opposing conductive plate 23 may be appropriately designed to provide the desired capacitance (so as to operate at the target frequency). For example, the opposing conductive plate 23 is formed in a square shape with each side of 13 mm. Considering a wavelength shortening effect by the support plate 22, this length of each side electrically corresponds to 0.2λ. Of course, the length of each side of the opposing conductive plate 23 can be changed as appropriate.

Here, the shape of the opposing conductive plate 23 is square for example, but alternatively, as another configuration, the shape of the opposing conductive plate 23 in the top view may be circular, regular octagon, regular hexagon, or the like. Further, the opposing conductive plate 23 may have a rectangular shape or a long ellipse shape. The opposing conductive plate 23 may have a bi-directional line-symmetrical shape. The opposing conductive plate 23 may be a point-symmetrical figure such as a circle, a square, a rectangle, or a parallelogram.

The opposing conductive plate 23 may have slits and/or rounded corners. A part or whole of the edge of the opposing conductive plate 23 may have a meander shape. The bi-directional line-symmetrical shape may have minute projections and recesses (about several millimeters in size) on its edge. The projections and recesses provided on the edge of the opposing conductive plate 23 and having sizes not affecting the operations of the antenna device 20 are ignorable. This technical concept for the shape of the opposing conductive plate 23 can be adopted to the shape of the ground plate 21.

The opposing conductive plate 23 is connected to a feeder line 25. In the present embodiment, a position where the feeder line 25 is connected to the opposing conductive plate 23 is on a line that passes through a center of the opposing conductive plate 23 and divides the opposing conductive plate 23 in half. In FIG. 2, the straight lines Lx and Ly are lines that pass through the center of the opposing conductive plate 23 and divide the opposing conductive plate 23 in half. The straight line Lx is parallel to the X-axis and the straight line Ly is parallel to the Y-axis. An intersection of these two straight lines Lx and Ly is the center of the opposing conductive plate 23.

The position where the feeder line 25 is connected to the opposing conductive plate 23 may be set at a position where the input and output impedances of the opposing conductive plate 23 achieve impedance matching. The position where the feeder line 25 is connected to the opposing conductive plate 23 is, for example, an edge portion or a central region of the opposing conductive plate 23.

As a method of feeding power to the opposing conductive plate 23, various methods can be adopted, such as an electromagnetic coupling method, in addition to a direct connection power supply method employed in the present embodiment. The electromagnetic coupling method is a power supply method using electromagnetic coupling between a microstrip line or the like for power supply and the opposing conductive plate 23.

The opposing conductive plate 23 is arranged to face the ground plate 21 in such an orientation that one set of opposite sides of the opposing conductive plate 23 is parallel to the X-axis and another set of opposite sides is parallel to the Y-axis. Further, in the present embodiment, the opposing conductive plate 23 is arranged so that the center of the ground plate 21 and the center of the opposing conductive plate 23 overlap in the top view.

Figure 3:
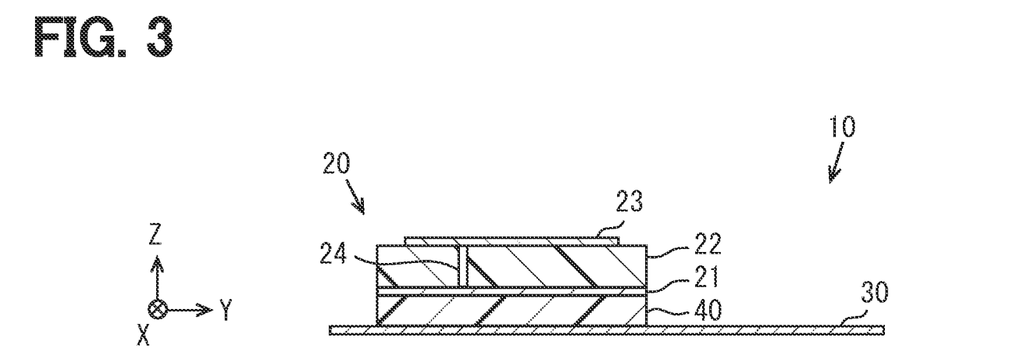
FIG. 3 is a cross sectional view of the antenna mounting system.

The short-circuit pin 24 is a conductive member that connects the ground plate 21 and the opposing conductive plate 23. FIG. 3 is a cross-sectional view of the antenna mounting system 10 taken along a plane that extends on the straight line Ly and is perpendicular to the opposing conductive plate 23 and the ground plate 21. The short-circuit pin 24 has one end connected to the opposing conductive plate 23 and the other end connected to the ground plate 21. The short-circuit pin 24, for example, is provided as a via installed in a printed circuit board of the support plate 22. The short-circuit pin 24 may be provided as a conductive pin. By adjusting a diameter and the length of the short-circuit pin 24, the inductance of the short-circuit pin 24 can be adjusted.

Further, by adjusting a position of the short-circuit pin 24 relative to the opposing conductive plate 23, an signal strength and a phase of the radio wave radiated by the antenna device 20 in the direction perpendicular to the ground plate 21 can be adjusted. As shown in FIG. 2, the short-circuit pin 24 is connected to the opposing conductive plate 23 at a position shifted from the center of the opposing conductive plate 23 toward the center of the conductive base plate 30 in a Y-axis direction that is a widthwise direction of the conductive base plate 30. In the present embodiment, the position of the short-circuit pin 24 on the opposing conductive plate 23 is a position shifted from the center of the opposing conductive plate 23 by 3 mm. The reason for this arrangement will be described later with reference to FIG. 7.

Operation of Antenna Mounting System

Next, the operation of the antenna mounting system 10 configured above will be described. The opposing conductive plate 23 and the ground plate 21 are short-circuited by the short-circuit pin 24, and the antenna device 20 produces LC parallel resonance at a resonance frequency determined based on the inductance provided by the short-circuit pin 24 and the capacitance between the opposing conductive plate 23 and the ground plate 21. The distance between the ground plate 21 and the opposing conductive plate 23, i.e., the thickness of the support plate 22 is much shorter than the wavelength of the radio waves transmitted and received by the antenna device 20. This resonance is the zeroth order resonance.

Due to this LC parallel resonance, an electric field perpendicular to the ground plate 21 and the opposing conductive plate 23 occurs between the ground plate 21 and the opposing conductive plate 23. This vertical electric field propagates from the short-circuit pin 24 toward the edge of the opposing conductive plate 23. Then, at the edge of the opposing conductive plate 23, the vertical electric field propagates through space as a ground-plate vertically-polarized wave. The ground-plate vertically-polarized wave is a radio wave in which an oscillation direction of its electric field is perpendicular to the ground plate 21 and the opposing conductive plate 23. When the antenna device 20 is used in an orientation parallel to the horizontal plane, the ground-plate vertically-polarized wave is a polarized wave perpendicular to the ground (i.e., an ordinary vertically polarized wave).

Figure 4:
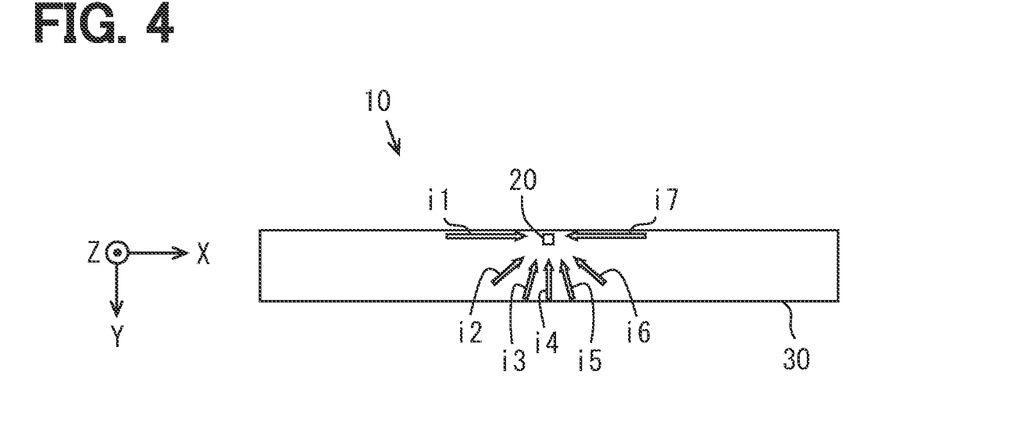
FIG. 4 is a schematic diagram showing a current flowing through a conductive base plate.

In addition, when the LC parallel resonance occurs, an electric field is also generated between the conductive base plate 30 and the opposing conductive plate 23. This electric field causes a current flowing through the conductive base plate 30. FIG. 4 is a diagram schematically showing a current flowing through the conductive base plate 30. In FIG. 4, arrows i1, i2, i3, i4, i5, i6, and i7 indicate directions of current flowing through the conductive base plate 30.

Since the voltage generated in the conductive base plate 30 is minimized at a position directly below the antenna device 20, the current in the conductive base plate 30 flows toward the position directly below the antenna device 20, as shown in FIG. 4.

Due to the current flowing through the conductive base plate 30, a radio wave is radiated from the conductive base plate 30. The radio wave radiated from the conductive base plate 30 is also radiated in the direction perpendicular to the conductive base plate 30. In the antenna mounting system 10 of the present embodiment, it is assumed that the radiation in the direction perpendicular to the conductive base plate 30 is unnecessary.

Both arrows i1 and i7 indicate currents along one edge of the conductive base plate 30 parallel to the lengthwise direction of the conductive base plate 30. The currents indicated by arrows i1 and i7 flow symmetrically about the position where the antenna device 20 is mounted. These currents indicated by arrows i1 and i7 are the same in magnitude but 180 degrees different in flow direction from each other. This is because the position where the antenna device 20 is mounted on the conductive base plate 30 is located at the center in the lengthwise direction of the conductive base plate 30 on the edge in the widthwise direction of the conductive base plate 30.

The radio waves radiated from currents having the same magnitude and 180 degrees different directions will have the same magnitude and opposite directions. Therefore, the radio waves radiated perpendicularly to the conductive base plate 30 by the respective currents indicated by the arrows i1 and i7 cancel each other out. For the same reason as the radio waves due to the currents indicated by the arrows i1 and i7, the radio waves caused by X components of currents indicated by the arrows i2 and i6, and the X components of currents indicated by the arrows i3 and i5 also cancel each other out.

Y components of currents indicated by the arrows i2, i3, i5, and i6 and a current indicated by the arrow i4 parallel to the Y axis also radiate radio waves in the direction perpendicular to the conductive base plate 30. However, the conductive base plate 30 does not emit a radio wave that cancels out these radio waves.

A radio wave radiated in the direction perpendicular to the conductive base plate 30 due to a current component parallel to the Y-axis is a linearly polarized wave in which an oscillation direction of the electric field is parallel to the Y-axis. A main plane of polarization of this linearly polarized wave is a plane perpendicular to the ground plate 21 and the opposing conductive plate 23 and parallel to the Y-axis, i.e., YZ plane. Hereinafter, a linearly polarized wave that is radiated in a Z-axis direction and having an oscillation direction of an electric field parallel to the Y-axis is referred to as a Y-axis polarized wave.

Each of the arrows i1 to i7 indicates only a part of the current flowing through the conductive base plate 30. However, for the same reason as the radio waves radiated in the direction perpendicular to the conductive base plate 30 by the X component of the current indicated by the arrows i1 to i7, a radio wave radiated in the direction perpendicular to the conductive base plate 30 by an X component of a current flowing through the conductive base plate 30 is cancelled out.

On the other hand, the conductive base plate 30 does not emit a radio wave that cancels out a radio wave radiated in the direction perpendicular to the conductive base plate 30 by a Y component of the current flowing through the conductive base plate 30. Therefore, in this embodiment, the antenna device 20 is configured to emit a radio wave that cancels a Y-axis polarized wave radiated from the conductive base plate 30.

Figure 5:
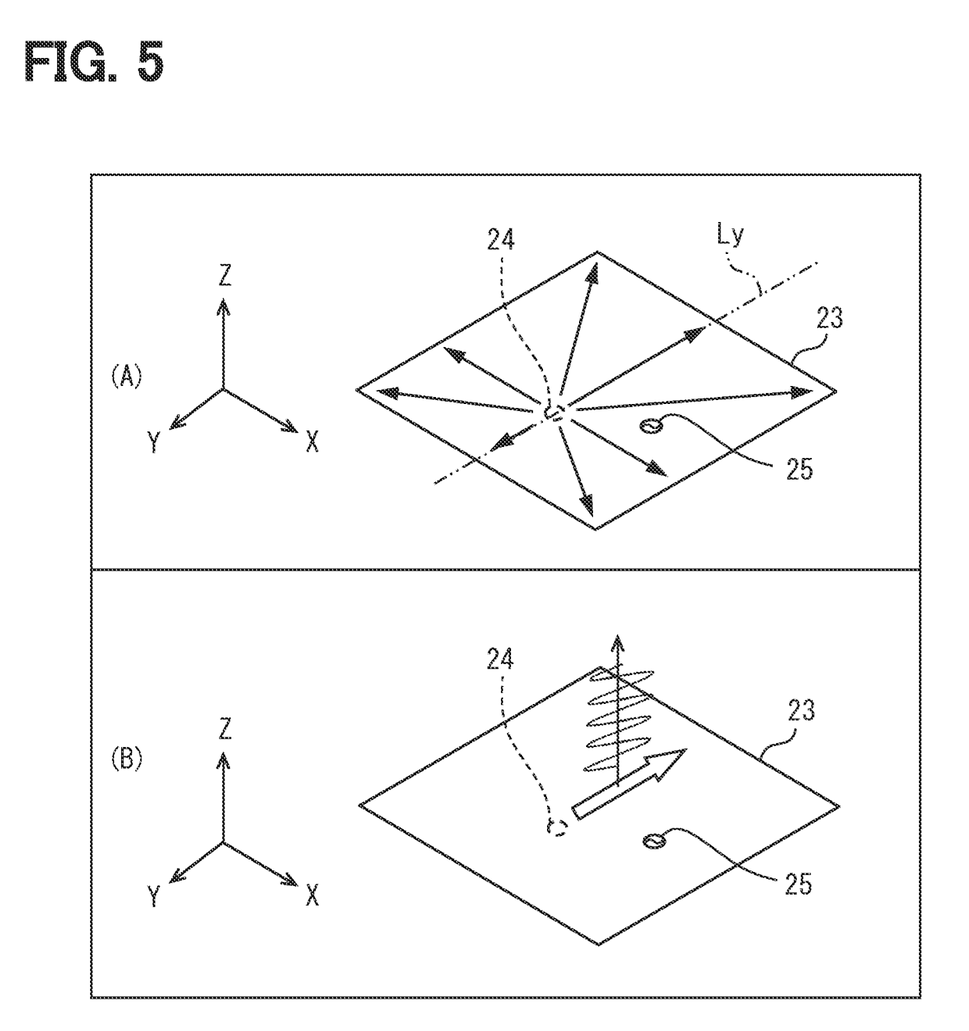
FIG. 5 is a diagram showing a current flowing through an opposing conductive plate.

FIG. 5 is a diagram showing currents flowing through the opposing conductive plate 23. The short-circuit pin 24 is connected to the opposing conductive plate 23 at a position shifted from the center of the opposing conductive plate 23. Therefore, as shown in (A) of FIG. 5, the symmetry of the current distribution flowing through the opposing conductive plate 23 is lost.

Specifically, the short-circuit pin 24 is connected to the opposing conductive plate 23 at a position shifted in the Y-axis direction from the center of the opposing conductive plate 23. Therefore, the currents flowing through the opposing conductive plate 23 are asymmetrical with respect to the center of the opposing conductive plate 23 in the Y-axis direction.

As a result, as shown in (B) of FIG. 5, the radio waves radiated by the current components in the Y axis direction flowing through the opposing conductive plate 23 remain uncanceled. Therefore, a linearly polarized wave having the oscillation direction of electric field parallel to the Y-axis is radiated from the opposing conductive plate 23 in a direction perpendicular to the opposing conductive plate 23. That is, in this embodiment, a Y-axis polarized wave is radiated from the antenna device 20, too.

Since the symmetry of the current components in an X-axis direction in the opposing conductive plate 23 is maintained, the linearly polarized waves having the electric field oscillating in the X-axis direction cancel each other. Therefore, the linearly polarized wave radiated from the opposing conductive plate 23 and having the oscillation direction of electric field parallel to the X-axis can be attenuated to a negligible level.

Unlike this antenna device 20, if the position of the short-circuit pin 24 is displaced in the X-axis direction from the center of the opposing conductive plate 23, a linearly polarized wave having the oscillation direction of electric field parallel to the X-axis is radiated from the opposing conductive plate 23 perpendicularly to the opposing conductive plate 23.

As can be seen from the above description, when the position of the short-circuit pin 24 is shifted from the center of the opposing conductive plate 23, the opposing conductive plate 23 radiates the linearly polarized wave having the oscillation direction of the electric field parallel to a direction from the center of the opposing conductive plate 23 to the position at which the short-circuit pin 24 is connected to the opposing conductive plate 23. In other words, when the short-circuit pin 24 is shifted from the center of the opposing conductive plate 23, the opposing conductive plate 23 radiates a linearly polarized wave having the oscillation direction of the electric field parallel to the opposing conductive plate 23.

A main plane of the above linearly polarized wave radiated from the antenna device 20 is perpendicular to the XY plane and parallel to the direction from the center of the opposing conductive plate 23 to the position where the short-circuit pin 24 is connected to the opposing conductive plate 23. For example, as described above, when the short-circuit pin 24 is arranged at a position shifted in a direction parallel to the Y-axis from the center of the opposing conductive plate 23, the main plane of polarization is parallel to the YZ plane.

Position of Short-Circuit Pin 24 and Gain of Linearly Polarized Wave

Figure 6:
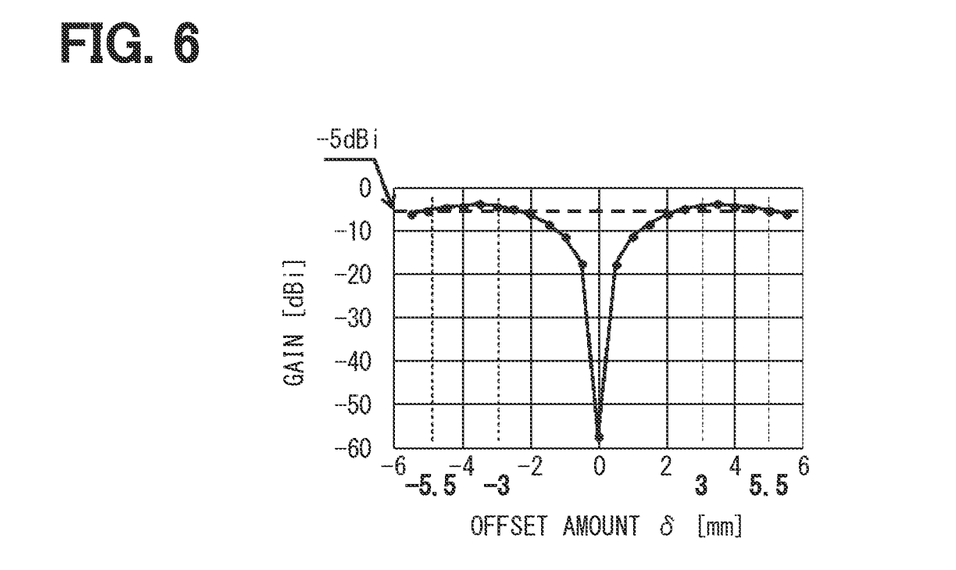
FIG. 6 is a diagram showing a relationship between an offset amount δ of a short-circuit pin and a radiation gain.

FIG. 6 shows a relationship between an offset amount δ of the short-circuit pin 24 and a radiation gain of a linearly polarized wave radiated from the opposing conductive plate 23 of the antenna device 20. FIG. 6 shows the gain when the antenna device 20 is alone, i.e., the antenna device 20 is not mounted on the conductive base plate 30. The offset amount δ is a length in the Y direction from the center of the opposing conductive plate 23 to the position of the short-circuit pin 24. Moreover, a direction in which the offset amount increases corresponds to a direction from the center of the opposing conductive plate 23 to the base plate center 31.

As shown in FIG. 6, the radiation gain increases as the absolute value of the offset amount δ increases. This is because a difference between a magnitude of the current flowing in a positive direction of the Y-axis from the short-circuit pin 24 and a magnitude of the current flowing in a negative direction of the Y-axis from the short-circuit pin 24 in the opposing conductive plate 23 becomes larger with increase in absolute value of the offset amount δ. In FIG. 6, the value of −5 dBi is a radiation gain of a linearly polarized wave radiated from the conductive base plate 30 in the antenna mounting system 10 and has been measured separately.

As is clear from FIG. 6, in order to let the Y-axis polarized wave radiated from the antenna device 20 cancel the Y-axis polarized wave radiated from the conductive base plate 30, the offset amount δ may be set to ±3 mm or ±5.5 mm.

Of course, the appropriate offset amount δ varies depending on the radiation gain of the linearly polarized wave radiated from the conductive base plate 30 in the antenna mounting system 10. The radiation gain of the linearly polarized wave radiated from the conductive base plate 30 changes depending on a magnitude of the current flowing through the conductive base plate 30. The magnitude of the current flowing through the conductive base plate 30 varies depending on the size of the conductive base plate 30 and the position of the antenna device 20 on the conductive base plate 30, for example. Therefore, it is necessary to determine the appropriate offset amount δ by measurement or the like.

Position of Short-Circuit Pin 24 and Phase of Linearly Polarized Wave

Figure 7:
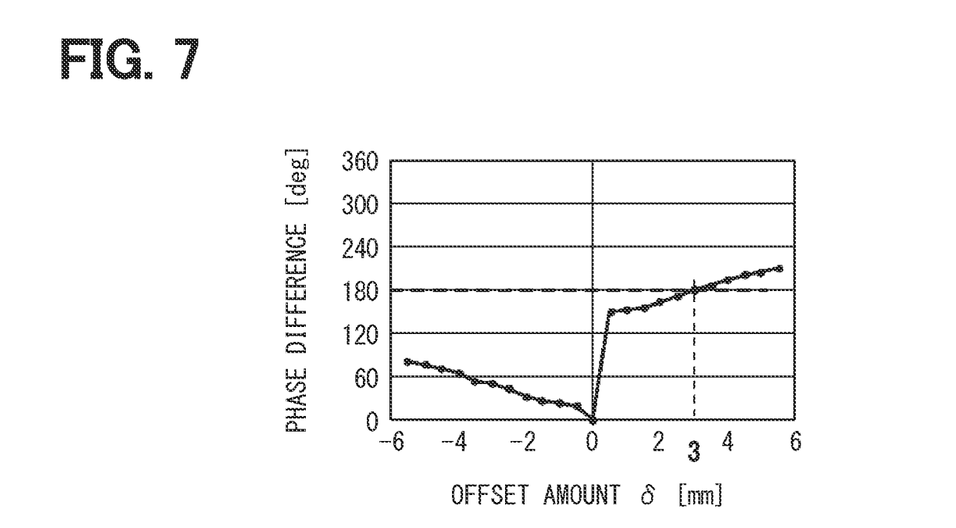
FIG. 7 is a diagram showing a relationship between the offset amount δ of the short-circuit pin and a phase difference.

FIG. 7 shows a relationship between the offset amount δ of the short-circuit pin 24 and a phase difference relative to a phase of a linearly polarized wave radiated from the antenna device 20 in which the offset amount δ is zero: δ=0. FIG. 7 also shows data when the antenna device 20 is alone. When the offset amount δ is negative, the phase difference increases with increase in absolute value of the offset amount δ. In other words, when the offset amount δ is negative, the phase difference decreases as the offset amount δ approaches zero.

When the offset amount δ is positive, the phase difference can be obtained by adding 180 degrees to a phase difference that corresponds to an offset amount δ being negative and the same in absolute value as the positive offset amount δ. This is because a direction of current flow is reversed when the sign of the offset amount δ is reversed. The graph of the offset amount δ on the positive side shows the phase difference increases as the absolute value of the offset amount δ increases.

The reason why the phase difference relative to the phase at the offset amount δ of zero (i.e., δ=0 mm) increases with increase in absolute value of the offset amount δ is that an inductance increases with increase in absolute value of the offset amount δ.

In order to let the Y-axis polarized wave radiated from the antenna device 20 cancel out the Y-axis polarized wave radiated from the conductive base plate 30 most effectively, the phase difference of these Y-axis polarized waves may be set to 180 degrees. Assuming that the phase difference is 0 degrees when the offset amount δ is equal to 0 mm, based on FIG. 7, the offset amount δ may be set at 3 mm.

Unlike the radiation gain shown in FIG. 6, there is a difference between phase differences corresponding to offset amounts δ that are different in sign but the same in absolute value. This is because, as mentioned above, the direction of the current is reversed when the sign of the offset amount δ is reversed. The direction in which the offset amount δ shown in FIG. 7 has a positive value, in other words, the direction from the center of the opposing conductive plate 23 to the position connecting the short-circuit pin 24, is exactly opposite to the direction from the base plate center 31 to the position the antenna device 20 arranged.

The relationship between the offset amount δ and the phase difference also changes depending on the inductance of the opposing conductive plate 23. Therefore, from the viewpoint of the phase difference, it is necessary to determine the appropriate offset amount δ by measurement or the like.

Figure 8:
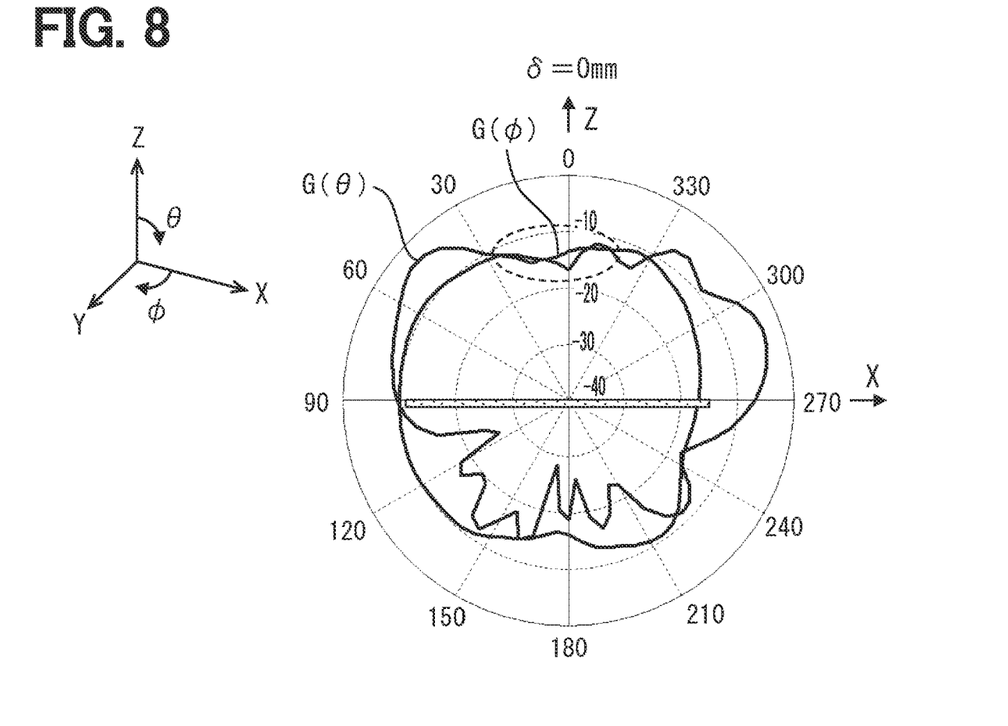
FIG. 8 shows the radiation gain of the antenna mounting system when δ=3 mm.
Figure 9:
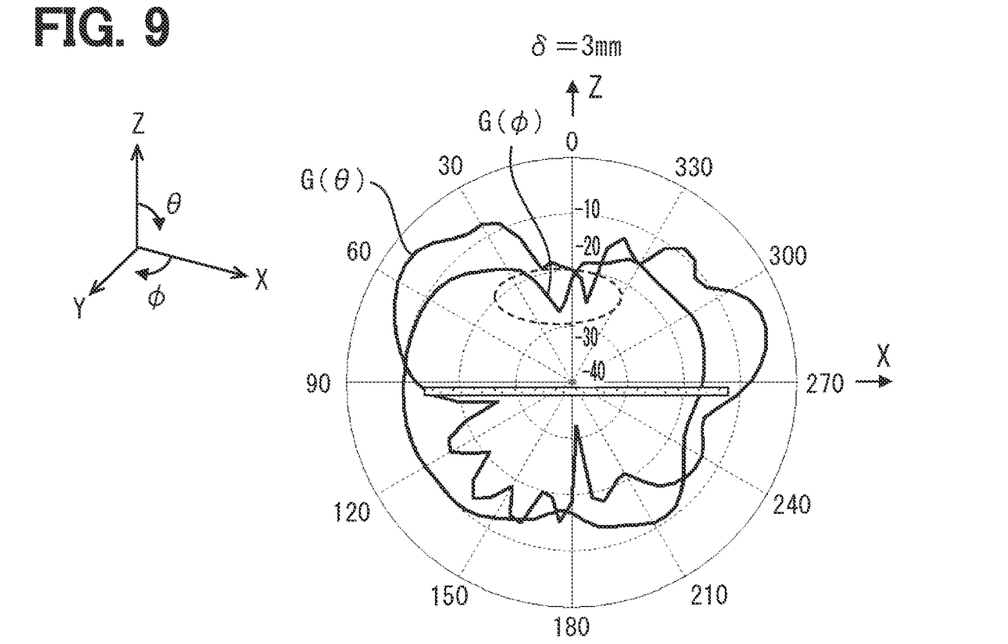
FIG. 9 shows the radiation gain of the antenna mounting system when δ=3 mm.

Under the present experimental conditions, considering the phase difference in addition to the radiation gain, the offset amount δ may be set at 3 mm. Effects of the present embodiment will be described with reference to FIGS. 8 and 9. In FIGS. 8 and 9, G(φ) is the gain of the Y-axis polarized wave, and G(θ) is the gain of the ground-plate vertically-polarized wave. FIG. 8 shows the radiation gain of the antenna mounting system 10 in which the offset amount δ is equal to 0 mm. FIG. 9 shows the radiation gain of the antenna mounting system 10 in which the offset amount δ is equal to 3 mm.

By comparing the portion enclosed by the dashed line between FIGS. 8 and 9, it can be seen that the gain in the Z-axis direction can be reduced by setting the offset amount δ at 3 mm.

Overview of Embodiment

In this antenna mounting system 10, a current also flows through the conductive base plate 30 due to an electromagnetic coupling between the antenna device 20 and the conductive base plate 30. Due to this current, an unnecessary radio wave is radiated from the conductive base plate 30 in the direction perpendicular to the ground plate. In this embodiment, the unnecessary radio wave radiated from the conductive base plate 30 in the direction perpendicular to the ground plate 21 is a Y-axis polarized wave.

The antenna device 20 has a configuration for radiating a radio wave that partially cancel out this unnecessary radio wave. Specifically, the antenna device 20 has the short-circuit pin 24 which short-circuits the opposing conductive plate 23 and the ground plate 21 at a position shifted from the center of the opposing conductive plate 23 in a predetermined direction. As a result, the antenna device 20 also radiates a radio wave in the direction perpendicular to the ground plate 21.

A main plane of polarization of the radio wave radiated from the antenna device 20 in the direction perpendicular to the ground plate 21 can be adjusted by changing a direction from the center of the opposing conductive plate 23 toward the position where the short-circuit pin 24 is connected. In this embodiment, the position of the short-circuit pin 24 is shifted from the center of the opposing conductive plate 23 in a direction parallel to the Y-axis. As a result, a Y-axis polarized wave is radiated from the antenna device 20 similarly to the radio wave radiated from the conductive base plate 30.

In addition, a phase of the radio wave radiated from the antenna device 20 in the direction perpendicular to the ground plate 21 can be adjusted by changing a distance from the center of the opposing conductive plate 23 to the short-circuit pin 24. Therefore, in the present embodiment, this distance is adjusted such that the phase of the Y-axis polarized wave radiated by the antenna device 20 is shifted by 180 degrees from the phase of the Y-axis polarized wave radiated by the conductive base plate 30.

Since the phase difference between the Y-axis polarized waves emitted by the conductive base plate 30 and the antenna device 20 is 180 degrees, a signal strength of a composite wave of the Y-axis polarized waves is lower than that of the Y-axis polarized wave emitted by the conductive base plate 30. Therefore, a radiation in the direction perpendicular to the ground plate 21, which is an unnecessary radiation, is reduced.

Although the embodiment of the present disclosure has been described above, the present disclosure is not limited to the above embodiment, and various modified examples described below are also included in the technical scope of the present disclosure. Furthermore, various modifications other than the following can be made without departing from the gist.

First Modification

Other Examples of Antenna Location and Short-Circuit Pin Location

Figure 10:
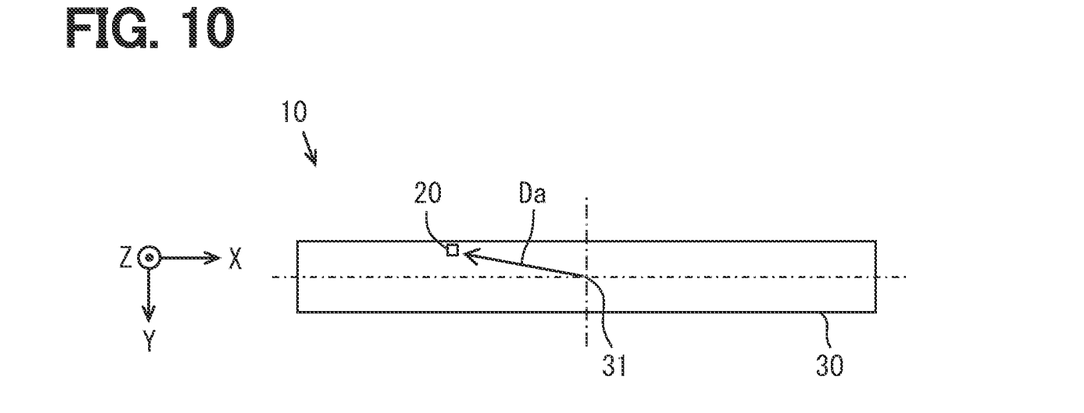
FIG. 10 is a diagram for explaining an antenna-mounted direction.

In the above embodiment, the antenna device 20 is shifted only in the Y-axis direction from the base plate center 31. However, the installation position of the antenna device 20 is arbitrary. FIG. 10 shows an example in which the antenna device 20 is installed at a position shifted from the base plate center 31 in both the Y-axis direction and the X-axis direction. A direction from the base plate center 31 toward the center of the antenna device 20 on the conductive base plate 30 is referred to as an antenna-mounted direction Da.

Figure 11:
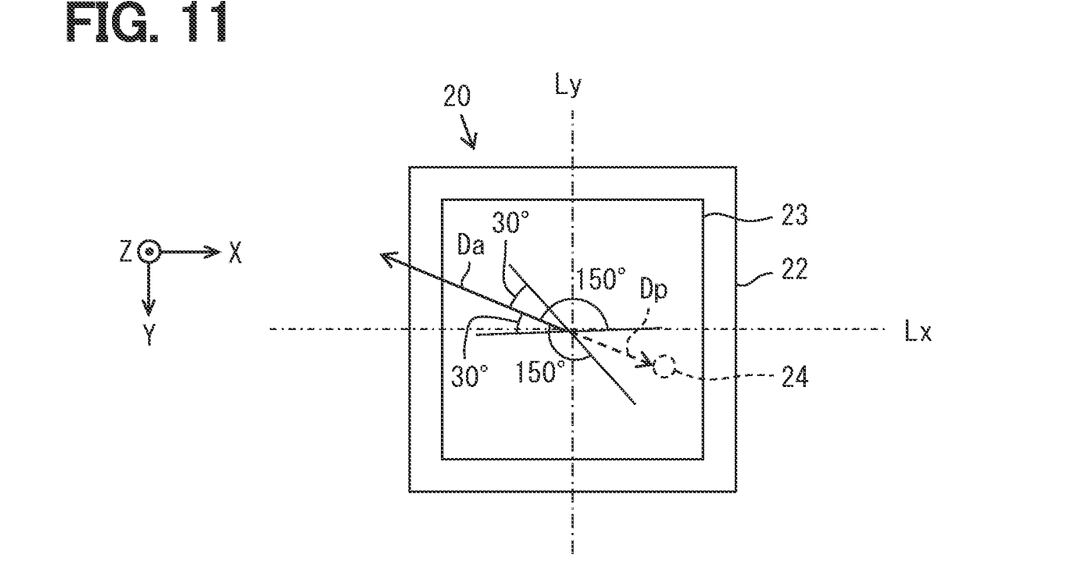
FIG. 11 is a diagram for explaining a pin-connected direction.

FIG. 11 shows a pin-connected direction Dp. The pin-connected direction Dp is a direction from the center of the opposing conductive plate 23 to the position where the short-circuit pin 24 is connected on the opposing conductive plate 23. Further, in the example shown in FIG. 11, an angle difference ΔD between the antenna-mounted direction Da and the pin-connected direction Dp is 180 degrees. As shown in FIG. 11, the angle difference ΔD between the antenna-mounted direction Da and the pin-connected direction Dp is a smaller one of angle differences between an arrow indicating the antenna-mounted direction Da and another arrow indicating the pin-connected direction Dp while the starting points of these arrows being at the same point.

The antenna-mounted direction Da means a direction of the main plane of polarization of the radio wave radiated from the conductive base plate 30. Also, the pin-connected direction Dp means a direction of the main plane of polarization of the radio wave radiated from the opposing conductive plate 23 of the antenna device 20. Therefore, unless the pin-connected direction Dp is perpendicular to the antenna-mounted direction Da, the radio wave radiated from the antenna device 20 in the direction perpendicular to the ground plate 21 has a polarization component that oscillates in a direction parallel to the main plane of polarization of the radio wave radiated from the conductive base plate 30 in the direction perpendicular to the ground plate 21.

In order to let the radio wave radiated from the opposing conductive plate 23 of the antenna device 20 cancel the radio wave radiated from the conductive base plate 30, it is effective that the main planes of polarization of these radio waves are parallel to each other. Therefore, the closer to parallel the pin-connected direction Dp and the antenna-mounted direction Da are, the more the unnecessary radiation can be reduced. Therefore, the pin-connected direction Dp may be parallel to the antenna-mounted direction Da. From this point of view, the angle difference ΔD may fall within a range from 0 degrees to 30 degrees, or a range from 150 degrees to 180 degrees. FIG. 11 shows the ranges of the desirable angular difference ΔD.

Furthermore, from the viewpoint of the phase difference, as shown in FIG. 7, the direction in which the short-circuit pin 24 is offset may be opposite to the direction from the base plate center 31 to the position where the antenna device 20 is arranged. That is, the angle difference ΔD may fall within the range from 150 degrees to 180 degrees. Furthermore, the angular difference ΔD may fall in a narrower angular range, e.g., from 165 degrees to 180 degrees.

Second Modification

Other Example of Phase Difference

In the embodiment, the phase difference between the phases of the radio waves radiated from the opposing conductive plate 23 of the antenna device 20 and the conductive base plate 30 is set at 180 degrees. The phase difference of 180 degrees may be most effective in order to weaken the signal strength of the composite wave of the radio waves. However, even when the phase difference is not 180 degrees, the signal strength of the composite wave can be made weaker than the radio wave radiated from the conductive base plate 30.

As the phase difference decreases from 180 degrees, a degree of cancelling out between the radio wave radiated from the opposing conductive plate 23 of the antenna device 20 and the radio wave radiated from the conductive base plate 30 decreases. Furthermore, in a certain phase range, the radio waves strengthen each other. When the phase difference is 0 degrees, the signal strength of the composite wave becomes max.

From these facts, by setting the phase difference to a value within 180±90 degrees, the signal strength of the composite wave can be made weaker than the radio wave radiated from the conductive base plate 30. That is, when the phase difference between the radio wave radiated from the conductive base plate 30 and the radio wave radiated from the opposing conductive plate 23 of the antenna device 20 falls within a range from 90 degrees to 270 degrees, the signal strength of the composite wave can be made weaker than the radio wave radiated from the conductive base plate 30. Of course, the phase difference may be set as close to 180 degrees as possible. The phase difference may fall within a range from 135 degrees to 225 degrees.

What is claimed is:

1. An antenna mounting system comprising:
   an antenna device; and
   a conductive base plate made of a conductor on which the antenna device is mounted, wherein
   the antenna device includes:
      a ground plate made of a conductor with a flat plate shape;
      an opposing conductive plate made of a conductor with a flat plate shape, located a predetermined distance away from the ground plate, and electrically connected to a feeder line; and
      a short-circuit pin that electrically connects the opposing conductive plate and the ground plate, and
   the short-circuit pin is positioned to cause a radio wave radiated from the antenna device in a direction perpendicular to the ground plate such that the radio wave:
      has a polarization component that oscillates in a direction parallel to a main plane of polarization of a radio wave radiated from the conductive base plate in the direction perpendicular to the ground plate; and
      is shifted in phase from the radio wave radiated from the conductive base plate by a phase difference within a range from 90 degrees to 270 degrees.

2. The antenna mounting system according to claim 1, wherein
   an angular difference between an antenna-mounted direction and a pin-connected direction falls within a range from 0 degrees to 30 degrees, or a range from 150 degrees to 180 degrees,
   the antenna-mounted direction is a direction from a center of the conductive base plate to a position where the antenna device is mounted on the conductive base plate, and
   the pin-connected direction is a direction from a center of the opposing conductive plate to a position where the short-circuit pin is connected on the opposing conductive plate.

3. The antenna mounting system according to claim 2, wherein
   the angular difference between the antenna-mounted direction and the pin-connected direction falls within the range from 150 degrees to 180 degrees.

* * * * *